(12) United States Patent
Boyer et al.

(10) Patent No.: US 10,838,864 B2
(45) Date of Patent: Nov. 17, 2020

(54) PRIORITIZING LOCAL AND REMOTE MEMORY ACCESS IN A NON-UNIFORM MEMORY ACCESS ARCHITECTURE

(71) Applicant: ADVANCED MICRO DEVICES, INC., Santa Clara, CA (US)

(72) Inventors: Michael W. Boyer, Bellevue, WA (US); Onur Kayiran, Santa Clara, CA (US); Yasuko Eckert, Bellevue, WA (US); Steven Raasch, Boxborough, MA (US); Muhammad Shoaib Bin Altaf, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/992,885

(22) Filed: May 30, 2018

(65) Prior Publication Data
US 2019/0370173 A1 Dec. 5, 2019

(51) Int. Cl.
| | | |
|---|---|---|
| *G06F 12/08* | (2016.01) | |
| *G06F 12/0815* | (2016.01) | |
| *G06F 12/1045* | (2016.01) | |
| *G06F 12/0888* | (2016.01) | |
| G06F 12/126 | (2016.01) | |
| G06F 3/12 | (2006.01) | |
| G06F 9/50 | (2006.01) | |
| G06F 13/18 | (2006.01) | |
| G06F 13/30 | (2006.01) | |

(52) U.S. Cl.
CPC ...... *G06F 12/0815* (2013.01); *G06F 12/0888* (2013.01); *G06F 12/1045* (2013.01); *G06F 3/1263* (2013.01); *G06F 9/5038* (2013.01); *G06F 12/126* (2013.01); *G06F 13/18* (2013.01); *G06F 13/30* (2013.01); *G06F 2212/1008* (2013.01); *G06F 2212/657* (2013.01); *G06F 2212/684* (2013.01)

(58) Field of Classification Search
CPC ........................... G06F 12/0815; G06F 12/126
USPC ......................................................... 711/151
See application file for complete search history.

(56) References Cited

U.S. PATENT DOCUMENTS

| | | | | |
|---|---|---|---|---|
| 8,621,157 B2* | 12/2013 | Loh | ..................... | G06F 12/0862 711/137 |
| 2016/0092373 A1* | 3/2016 | Doshi | ................... | G06F 9/3889 711/122 |
| 2018/0113815 A1* | 4/2018 | Eckert | ................... | G06F 12/126 |

OTHER PUBLICATIONS

Ausavarungnirun, Rachata, et al., "Exploiting Inter-Warp Heterogeneity to Improve GPGPU Performance", International Converence on Parallel Architecture and Compilation (PACT), San Francisco, CA, Oct. 18-21, 2015, 14 pages.

* cited by examiner

*Primary Examiner* — Than Nguyen

(57) ABSTRACT

A miss in a cache by a thread in a wavefront is detected. The wavefront includes a plurality of threads that are executing a memory access request concurrently on a corresponding plurality of processor cores. A priority is assigned to the thread based on whether the memory access request is addressed to a local memory or a remote memory. The memory access request for the thread is performed based on the priority. In some cases, the cache is selectively bypassed depending on whether the memory access request is addressed to the local or remote memory. A cache block is requested in response to the miss. The cache block is biased towards a least recently used position in response to requesting the cache block from the local memory and towards a most recently used position in response to requesting the cache block from the remote memory.

20 Claims, 10 Drawing Sheets

PRIORITIZING LOCAL AND REMOTE MEMORY ACCESS IN A NON-UNIFORM MEMORY ACCESS ARCHITECTURE

STATEMENT OF SPONSORED RESEARCH

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

A non-uniform memory access (NUMA) architecture generally involves a memory system that includes different regions of memory that have different access latencies and/or different bandwidths to access the regions. One example of a NUMA architecture is a graphics processing system that includes multiple graphics processing units (GPUs) that are each associated with locally attached memory. In some cases, the GPUS are general purpose GPUs (GPGPUs) that perform general processing tasks in addition to or instead of graphics processing. The GPUs in the graphics processing system preferentially access information stored in their corresponding local memories, primarily due to the lower memory access latency, but the GPUs are not restricted to using local memory. The GPUs are also able to access remote memories associated with other processing units, albeit with larger memory access latencies. Other examples of NUMA architectures include local memories associated with processing units in multi-socket systems or processing units that are interconnected by scalable networks. In some cases, a NUMA architecture is implemented as a hybrid memory system including dynamic random access memory (DRAM), nonvolatile random access memory (NVRAM or NVM), or other types of memory that have different access characteristics. For example, NVRAM retains information when power is interrupted to the NVRAM at the cost of longer memory access latencies relative to DRAM. The different locations and types of memory in a NUMA architecture lead to potentially vast differences in the latency and bandwidth for access requests to local memory and remote memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
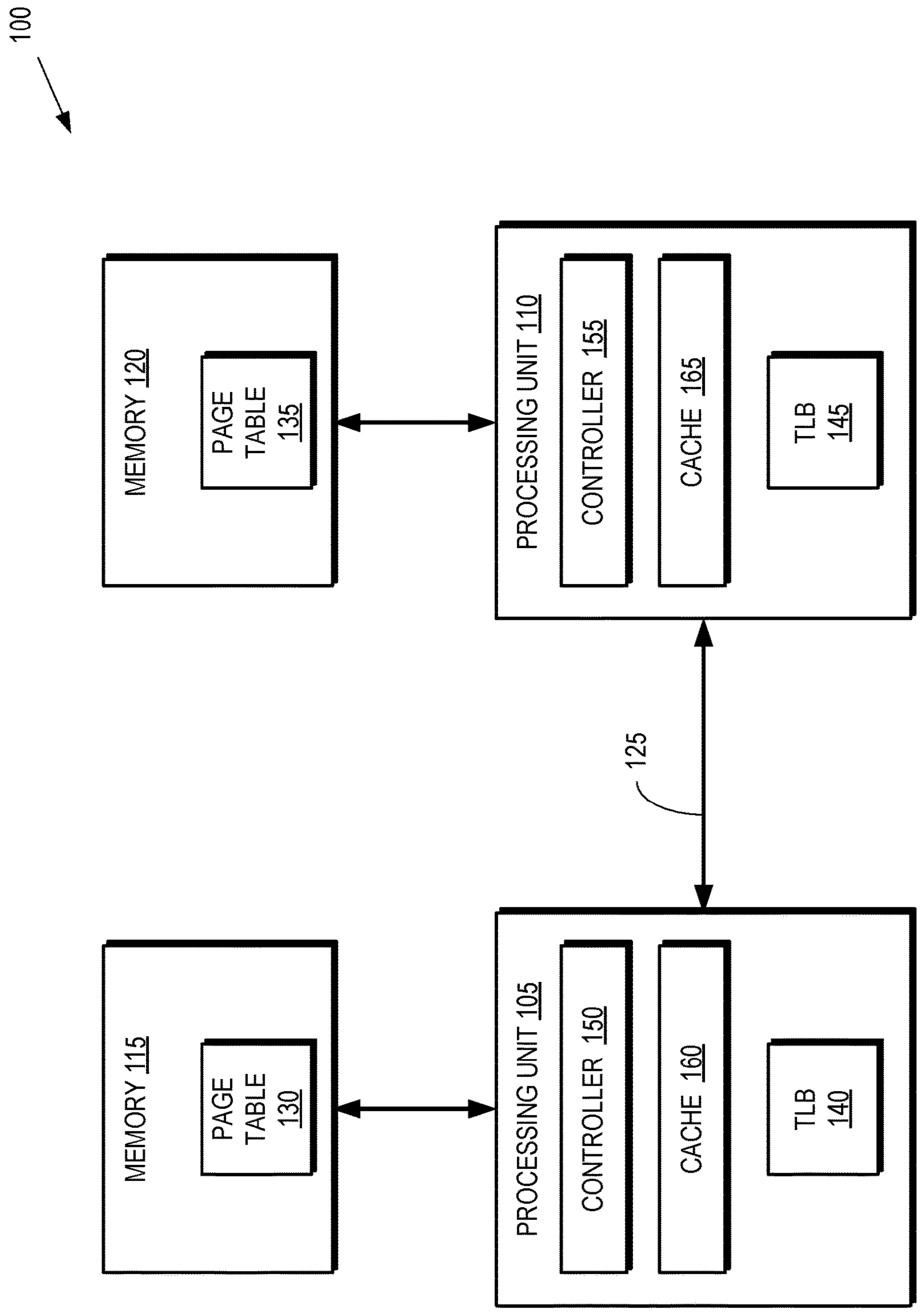
FIG. 1 is a block diagram of a processing system according to some embodiments.

Multithreading is used to leverage the parallel or concurrent processing power of processing units in a multiprocessor system. Each processing unit is able to execute a thread concurrently with execution of other threads by the other processing units, e.g., according to the single-instruction, multiple-data (SIMD) execution model. Processing system hardware clusters threads into wavefronts that concurrently execute the same instruction on different data. In some cases, programmers cluster multiple wavefronts into a workgroup or thread block. A thread that is performing a memory access instruction (e.g., a read or a write to a memory location indicated by an address in the instruction) initially attempts to find data that is stored at the memory location in a corresponding cache. If the memory access hits in the cache, the thread is able to perform the memory access instruction using the cached information. However, if the memory access misses in the cache, the thread is required to perform the memory access instruction on the actual location in the memory, which is either a local memory associated with the processing unit that is executing the thread or a remote memory associated with a different processing unit. All of the threads in a wavefront must complete execution of the memory access instruction before the thread is allowed to proceed to a subsequent instruction.

Memory divergence leads to stalling of the wavefronts when different threads in the wavefront perform a memory instruction using different physical locations such as a cache, a local memory, or a remote memory. For example, the latency required for a first thread to access a memory location in a local memory in response to a cache miss is significantly shorter than the latency required for a second thread to access a memory location in a remote memory in response to a cache miss. A wavefront that includes both the first and second threads will therefore stall until the second thread has completed the memory access to the remote memory, even if the first thread (and all the other threads in the wavefront) have already completed the memory access due to the lower latency of the local memory. Memory divergence also occurs between threads that hit in the cache and threads that miss in the cache. One suggestion for minimizing memory divergence for wavefronts that mostly include threads that miss in the cache is to artificially convert all of the threads in the mostly-miss wavefront to cache misses by bypassing the cache, thereby conserving bandwidth to the cache. Another suggestion is to modify cache insertion and eviction policies to control whether requests from subsequent threads will hit or miss in the cache. However, it is not typically possible to control whether a request will be to a memory location in a local memory or a remote memory.

FIGS. 1-13 disclose systems and techniques to improve effective memory latency and application performance in a non-uniform memory access (NUMA) architecture by modifying behavior of a memory system based on whether a memory access request from a thread in a wavefront is addressed to a location in a local memory or a remote memory, as well as information indicating whether other threads in the wavefront hit or missed in associated caches. In some embodiments, the memory access request selectively bypasses the cache based on the determination. For example, the memory access request bypasses a local cache if the location is in the local memory and attempts to access the local cache if the location is in the remote memory. Some embodiments of the cache are configured to preferentially store information from remote memories because of the greater latency savings of a cache hit relative to a cache hit to an address in a local memory. For example, a cache block requested from the local memory is biased towards the least recently used (LRU) position in the cache and a cache block from a remote memory is biased towards the most recently used (MRU) position in the cache, thereby increasing the probability that cache blocks requested from local memory will be evicted relative to the probability of evicting cache blocks requested from remote memory. The biasing is performed in response to the requested cache block being inserted into the cache.

Requests that miss in the cache are prioritized for memory access based on whether other threads in the wavefront hit or missed in the cache and whether the memory accesses are addressed to local or remote memories. In some embodiments, a thread in a wavefront that missed in the cache and is addressed to a remote memory location (a remote miss) is given highest priority if a fraction of other threads in the wavefront that hit in the cache is above a first threshold. A remote miss is given the second highest priority if a fraction of other threads in the wavefront that are local misses is above a second threshold. A remote miss is given a third highest priority if a fraction of other threads in the wavefront that are also remote misses is above a third threshold. A thread in a wavefront that missed in the cache and is addressed to a local memory location (a local miss) is given a fourth highest priority if a fraction of other threads in the wavefront that hit in the cache is above a fourth threshold. A local miss is given a fifth highest priority if a fraction of other threads in the wavefront that were also local misses is above a fifth threshold. A local miss is given a sixth highest priority if a fraction of other threads in the wavefront that are remote misses is above a sixth threshold. The thresholds can be configured statically, dynamically, or based on user input.

In some embodiments, memory controllers for the local and remote memories maintain a plurality of queues for threads having different priorities. The memory controller services the queues based on the relative priorities of the different queues. The priorities can be fixed, determined dynamically based on characteristics of the application that is generating the threads/wavefronts, set explicitly by software, or configured in some other manner. Priority categories can be merged to reduce the hardware overhead required to maintain separate queues. Some embodiments of the memory controllers implement time-batching to avoid starvation of requests from low priority queues. Instead of implementing queues for the priority categories, some embodiments of the memory controllers use the priorities as hints or parameters that are used to service different threads based on memory controller policies.

FIG. 1 is a block diagram of a processing system 100 according to some embodiments. The processing system 100 includes processing units 105, 110 that execute instructions stored in corresponding memories 115, 120, which store the instructions and data used by the processing units 105, 110, and results produced by the processing units 105, 110. In the illustrated embodiment, the processing units 105, 110 represent graphics processing units (GPUs) in a multi-GPU system. However, some embodiments of the processing units 105, 110 implement one or more central processing units (CPUs), specialized processing units or accelerators, application-specific integrated circuits (ASICs), field programmable gate arrays (FPGAs), processing units in a multi-socket system or processing units that are interconnected by scalable networks.

The processing system 100 includes memories 115, 120 that are implemented according to non-uniform memory access (NUMA) principles. For example, the processing unit 105 accesses the memory 115 directly using virtual addresses that are mapped to physical addresses in the memory 115. For another example, the processing unit 110 accesses the memory 120 directly using virtual addresses that are mapped to the physical addresses in the memory 120. Some embodiments of the processing units 105, 110 are able to access information stored in the non-local (or remote) memories. However, the processing units 105, 110 are not able to directly access the remote memories. Instead, the processing units 105, 110 transmit requests to the other processing unit over an interface 125. For example, memory access requests from the processing unit 105 to the memory 120 pass through the processing unit 110 via the interface 125. For another example, memory access requests from the processing unit 110 to the memory 115 pass through the processing unit 105 via the interface 125. Some embodiments of the interface 125 are implemented as high bandwidth interconnects according to industry-standards such as Peripheral Component Interconnect Express (PCIe), cache coherent interconnect for accelerators (CCIX), open coherent accelerator processor interface (OpenCAPI), and Gen-Z. Some embodiments of the interface 125 use proprietary technologies.

Translations of virtual addresses to physical addresses are stored in page tables 130, 135. Each process that is executing in the processing system 100 has a corresponding page table. The page table for a process translates the virtual addresses that are being used by the process to physical addresses in one or more of the memories 115, 120. In some embodiments, the entirety of the page table for a process is stored in one of the memories 115, 120. For example, if a process is executing on the processing unit 105, the page table 130 maps virtual addresses used by the process to physical addresses in one or more of the memories 115, 120. In some embodiments, the page table for a process is stored across a plurality of memories 115, 120. For example, if a process is executing on the processing unit 105, a portion of the page table content is stored in the page table 130 while the remaining portion of the page table content is stored in the page table 135. Both portions of the page table 130, 135 are used to provide mapping from virtual addresses used by the process to physical addresses in one or more of the memories 115, 120. The page tables 130, 135 are not constrained to map virtual addresses used by a process executing on one of the processing units 105, 110 to physical addresses in a corresponding one of the memories 115, 120. For example, the page table for a process executing on one of the processing units 105, 110 may map the virtual address space of the process to physical addresses in both of the memories 115, 120. If multiple processes are executing concurrently on one or more of the processing units 105, 110, the processing system 100 generates and maintains multiple page tables to map the virtual address spaces of the concurrent processes to physical addresses in one or more of the memories 115, 120.

Translations that are frequently used by the processing units 105, 110 are stored in translation lookaside buffers (TLBs) 140, 145 that are implemented in the corresponding processing units 105, 110. The TLBs 140, 145 are used to cache frequently requested virtual-to-physical address translations. Entries including frequently used address translations are written from the page tables 130, 135 into the corresponding TLBs 140, 145. The processing units 105, 110 are therefore able to retrieve the address translations from the TLBs 140, 145 without the overhead of searching for the translation in the page tables 130, 135. Entries are evicted from the TLBs 140, 145 to make room for new entries according to a TLB replacement policy.

Memory controllers 150, 155 are used to control access to the memories 115, 120, respectively. For example, the memory controllers 150, 155 receive requests to access locations within the memories 115, 120 and then schedule the access requests, e.g., based on requests stored in prioritized queues, as discussed below. The processing units 105, 110 are also associated with caches 160, 165, respectively, that are used to cache data or instructions that are frequently used by the processing units 105, 110. Information in the caches 160, 165, such as cache lines or cache blocks, are accessed using addresses included in the memory access requests. The addresses are virtual addresses or physical addresses, e.g., the physical addresses generated using entries in the TLBs 140, 145. The caches 160, 165 are used to cache information that is stored in either of the memories 115, 120. For example, a cache block from the memory 120 is stored in the cache 160 in response to the processing unit 105 sending a memory access request for the cache block that misses in the cache 160. Although the caches 160, 165 are shown as external to the corresponding processing units 105, 110, some embodiments of the processing units 105, 110 implement internal caches. Furthermore, some embodiments of the caches 160, 165 are part of a cache hierarchy.

Some embodiments of the processing units 105, 110 are multithreaded processors that are able to execute a thread concurrently with execution of other threads in a wavefront, e.g., according to the single-instruction, multiple-data (SIMD) execution model. For example, each thread that is concurrently performing a memory access instruction on the processing unit 105 (e.g., a read or a write to a memory location indicated by an address in the instruction) initially attempts to find data that is stored at the memory location in the cache 160. If the memory access hits in the cache 160, the thread is able to perform the memory access instruction using the cached information. However, if the memory access misses in the cache 160, the thread is required to perform the memory access instruction on the actual location in the memory, which is either the local memory 115 or the remote memory 120. All of the threads in a wavefront must complete execution of the memory access instruction before the thread is allowed to proceed to a subsequent instruction.

Memory divergence occurs when concurrent memory requests from threads in a single wavefront spend different amounts of time is retrieving their associated data from memory. Memory divergence leads to stalling of the wavefronts when different threads in the wavefront perform a memory instruction using different physical locations such as the cache 160, the local memory 115, or the remote memory 120. For example, the latency required for a first thread executing on the processing unit 105 to access a memory location in the local memory 115 in response to a miss in the cache 160 is significantly longer than the latency required for a second thread to access a memory location in the remote memory 120 in response to a miss in the cache 160. A wavefront that includes both the first and second threads will therefore stall until the second thread has completed the memory access to the remote memory 120, even if the first thread (and all the other threads in the wavefront) have already completed the memory access due to the lower latency of the cache 160 or the local memory 115.

To address the effects of memory divergence, the processing units 105, 110 are configured to detect misses in the corresponding caches 160, 165 by threads in a wavefront that are executing a memory access request concurrently on the processing units 105, 110. Priorities are assigned to the threads based on whether the memory access request is addressed to a local memory or a remote memory. For example, a thread that is executing a memory access request on the processing unit 105 and misses in the cache 160 is assigned a different priority depending on whether the memory access request is addressed to its local memory 115 or the remote memory 120. The memory access request for the thread is then performed based on the priority.

Figure 2:
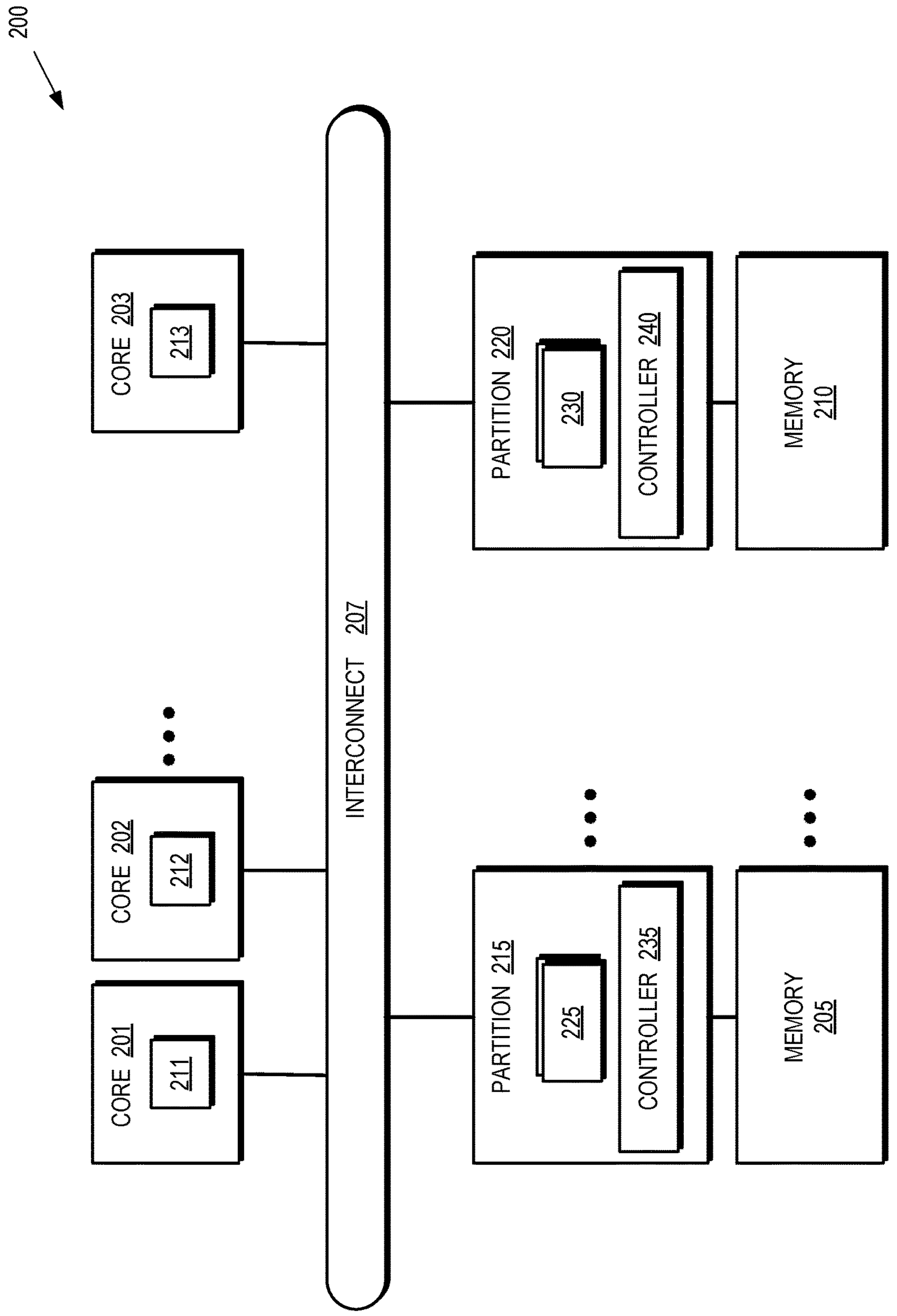
FIG. 2 is a block diagram of a processing unit according to some embodiments.

FIG. 2 is a block diagram of a processing unit 200 according to some embodiments. The processing unit 200 is used to implement some embodiments of the processing units 105, 110 shown in FIG. 1. The processing unit 200 includes processor cores 201, 202, 203 (collectively referred to herein as "the processor cores 201-203." Some embodiments of the processing unit 200 are used to implement a GPU and, in that case, the processor cores 201-203 are referred to as shader cores or streaming multi-processors. The number of processor cores 201-203 that are implemented in the processing unit 200 is a matter of design choice. For example, the processing unit 200 can implement fifteen processor cores 201-203. The processor cores 201-203 are configured to concurrently execute different wavefronts. For example, each processor core 201-203 can be configured to execute a wavefront including 32 threads per wavefront so that the processing unit 200 is able to evaluate up to 480 concurrent memory accesses per cycle using the fifteen processor cores 201-203.

The processor cores 201-203 are configured to execute instructions stored in corresponding memories 205, 210, which store the instructions and data used by the processor cores 201-203. The memories 205, 210 are also configured to store results produced by the processor cores 201-203. In the illustrated embodiment, the processor cores 201-203 are able to communicate with the memories 205, 210 via an interface 207, which is implemented as a bus, a bridge, or other type of interconnection. The memories 205, 210 are implemented as locally attached memories according to non-uniform memory access (NUMA) principles. Some embodiments of the memories 205, 210 are therefore used to implement the memory 115 associated with the processing unit 105 or the memory 120 associated with the processing unit 110 shown in FIG. 1.

The processor cores 201-203 include private caches 211, 212, 213, which are collectively referred to herein as "the caches 211-213." In some embodiments, the caches 211-213 are used to implement private L1 data, texture, and constant caches, as well as scratchpad memory that is utilized by the corresponding processor cores 201-203. The processing unit 200 also includes memory partition units 215, 220 that include one or more caches 225, 230 and corresponding memory controllers 235, 240. For example, the caches 225, 230 can be banked L2 cache slices that are used to cache information for access by one or more of the processor cores 201-203.

The processing unit 200 is susceptible to memory divergence because of the different latencies for threads that hit in the caches 225, 230 and threads that miss in the caches 225, 230 and are required to access information from the memories 115, 120. The sensitivity of wavefronts to memory latency and cache utilization are characterized by a hit ratio, which is defined as the percentage of memory requests that hit in the caches 225, 230 when the wavefront is executing a single memory instruction. In some embodiments, wavefronts are characterized based on their hit ratios as "all-hit" if all of the threads in the wavefront hit in the corresponding cache, "mostly-hit" if more than a threshold number of the threads in the wavefront hit in the corresponding cache, "balanced" if approximately the same number of threads hit and miss in the corresponding cache, "mostly-miss" if more than a threshold number of the threads in the wavefront miss in the corresponding cache, and "all-miss" miss in the corresponding cache. Wavefronts are also categorized by numbers or percentages of threads that hit or miss in a cache and are required to access information from local or remote memories such as the memories 115, 120 shown in FIG. 1.

Figure 3:
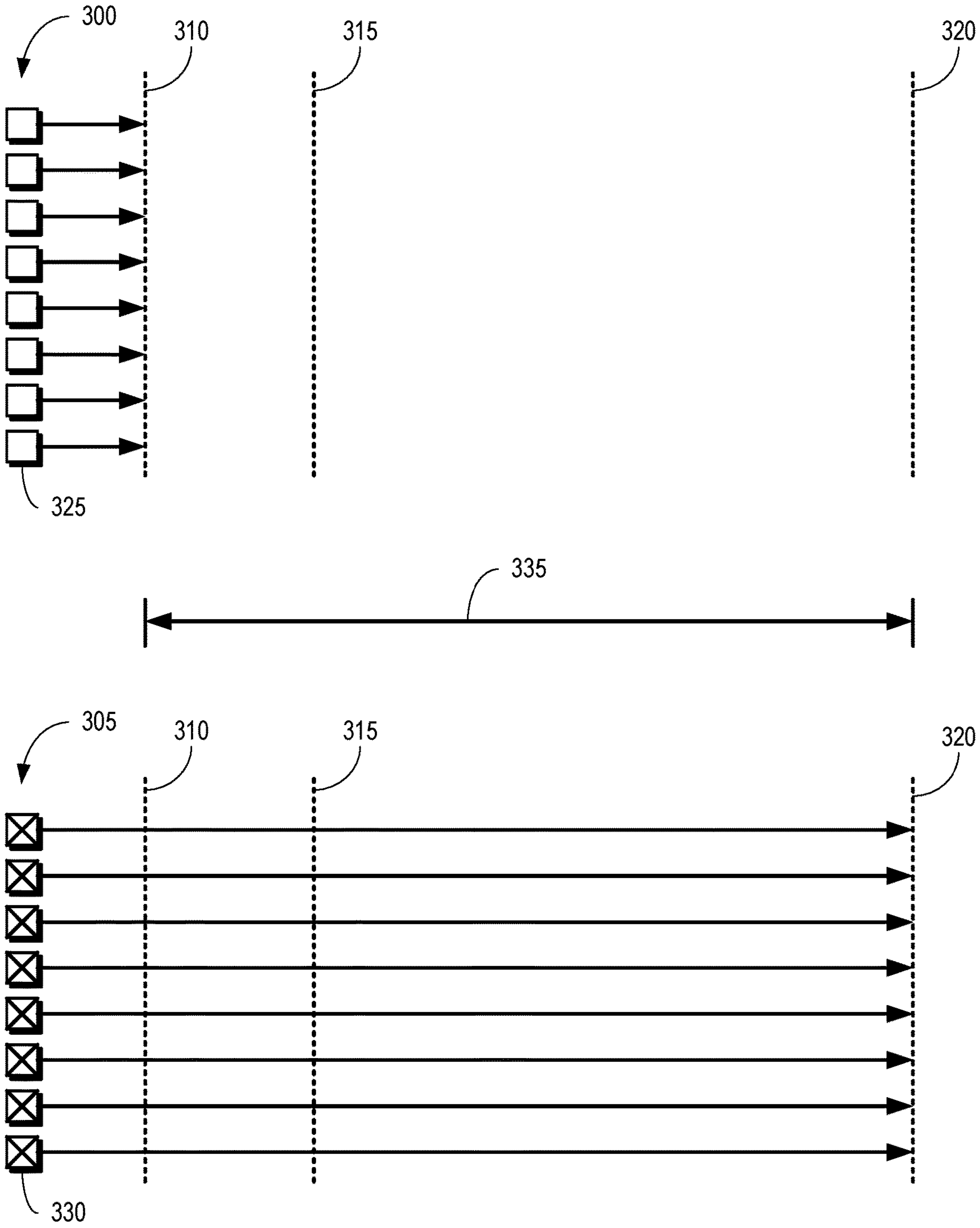
FIG. 3 illustrates an all-hit wavefront that includes threads executing a memory instruction and an all-miss wavefront that accesses information from a remote memory according to some embodiments.

FIG. 3 illustrates an all-hit wavefront 300 that includes threads executing a memory instruction and an all-miss wavefront 305 that accesses information from a remote memory according to some embodiments. The wavefronts 300, 305 execute on some embodiments of the processing units 105, 110 shown in FIG. 1 and the processing unit 200 shown in FIG. 2. Time increases from left to right in FIG. 3. The line 310 indicates a latency to service a memory access request that hits in a cache, the line 315 indicates a latency to service a memory access request that misses in the cache and is addressed to a location in a local memory, and the line 320 indicates a latency to service a memory access request that misses in the cache and is addressed to a location in a remote memory. Lines 310, 315, and 320 thus are also referred to herein as latencies 310, 315, and 320, respectively.

The wavefront 300 includes eight threads 325 (only one indicated by a reference numeral in the interest of clarity) that concurrently perform the same memory access request, which hits in the corresponding cache as indicated by the open box 325. The latency for the wavefront 300 is therefore equal to the latency for the threads 325, which is equal to the latency 310 to service memory access requests that hit in the cache. The wavefront 305 includes eight threads 330 (only one indicated by a reference numeral in the interest of clarity) that concurrently perform the same memory access request, which misses in the corresponding cache as indicated by the X in the box 330. The memory access request being executed by the threads 330 is addressed to a remote memory. The latency to service the memory access request for the wavefront 305 is equal to the latency 320 to service memory access requests from the remote memory. The latencies of the wavefronts 300, 305 differ by a time interval 335 that is equal to a difference between the latency 310 associated with the cache and the latency 330 associated with the remote memory.

Figure 4:
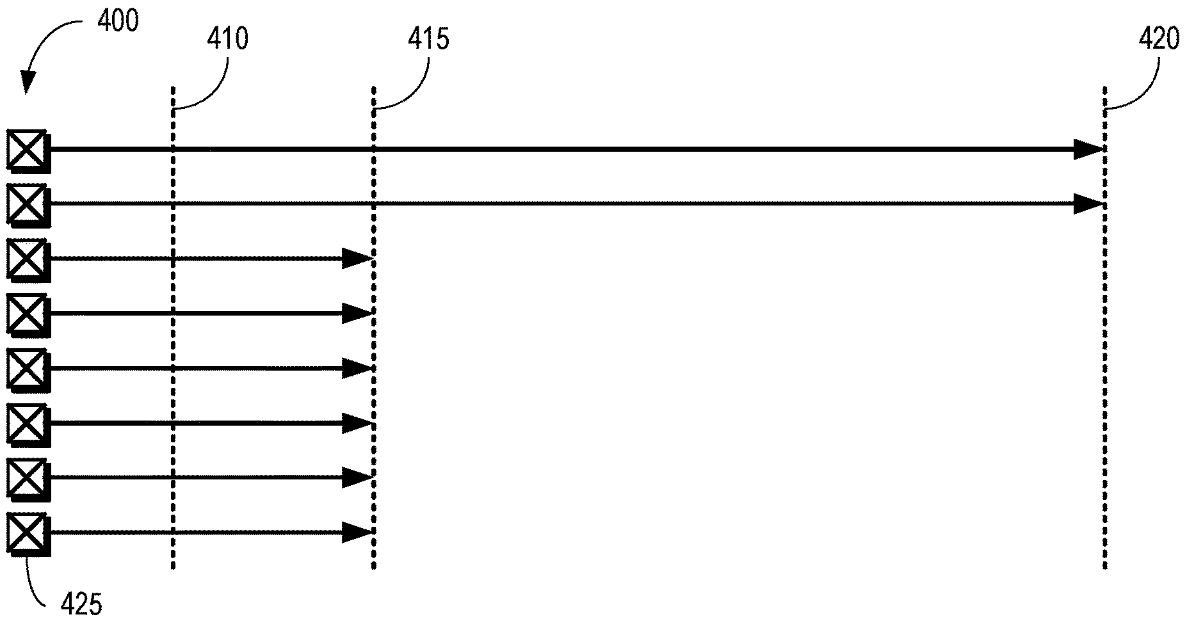
FIG. 4 illustrates a wavefront that includes threads executing a memory instruction that miss in a cache and access either a local memory or a remote memory according to some embodiments.

FIG. 4 illustrates a wavefront 400 that includes threads executing a memory instruction that miss in a cache and access either a local memory or a remote memory according to some embodiments. The wavefront 400 executes on some embodiments of the processing units 105, 110 shown in FIG. 1 and the processing unit 200 shown in FIG. 2. Time increases from left to right in FIG. 4. The line 410 indicates a latency to service a memory access request that hits in a cache, the line 415 indicates a latency to service a memory access request that misses in the cache and is addressed to a location in a local memory, and the line 420 indicates a latency to service a memory access request that misses in the cache and is addressed to a location in a remote memory. The wavefront 400 includes eight threads 425 (only one indicated by a reference numeral in the interest of clarity) that concurrently perform the same memory access request, which misses in the corresponding cache as indicated by the X in the boxes 425. Lines 410, 415, and 420 thus are also referred to herein as latencies 410, 415, and 420, respectively.

In the illustrated embodiment, two of the threads 425 are executing memory access requests to addresses in the remote memory and six of the threads 425 are executing memory access requests to addresses in the local memory. Since all the threads 425 missed in the corresponding cache, the latency to service the memory access request is determined by the latency 415 of the local memory and the latency 420 of the remote memory. The two threads 425 that access the local memory have a latency 415 and the sixth threads 425 that access the remote memory have a (longer) latency 420. As discussed herein, the wavefront 400 stalls until all the memory access requests performed by the threads 425 have been serviced. Thus, the wavefront 400 has a latency 420 that corresponds to the remote memory even though some of the threads 425 service their memory access requests with a shorter latency 415 corresponding to the local memory.

Figure 5:
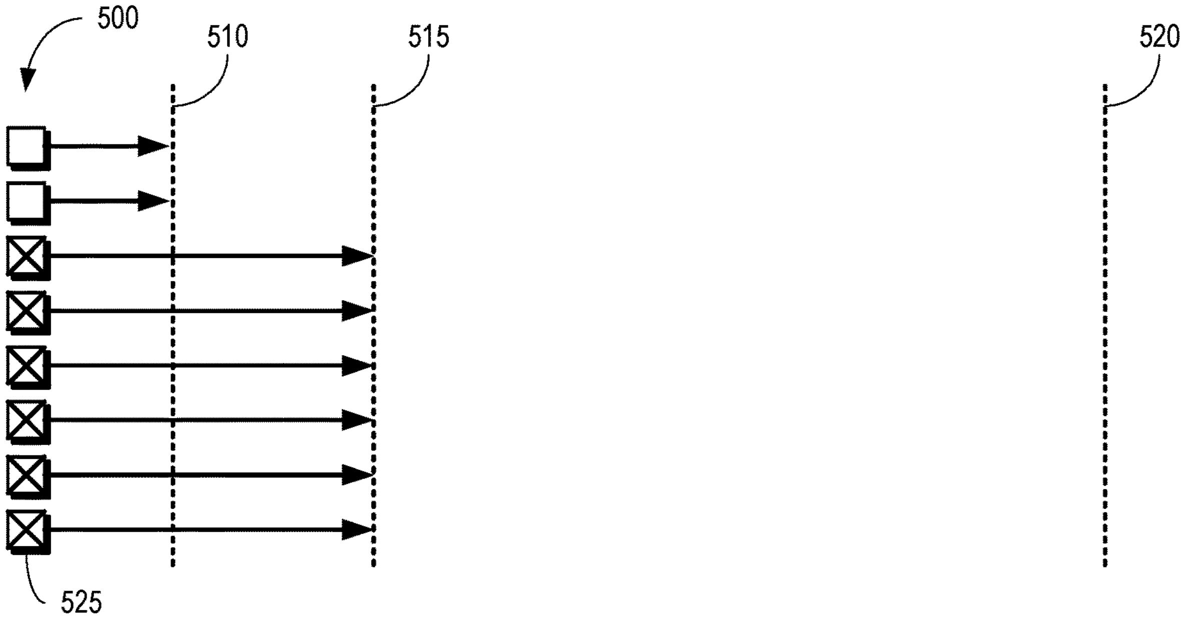
FIG. 5 illustrates a wavefront that includes threads executing a memory instruction that hits in a cache and threads executing the memory instruction that misses in the cache according to some embodiments.

FIG. 5 illustrates a wavefront 500 that includes threads executing a memory instruction that hits in a cache and threads executing the memory instruction that misses in the cache according to some embodiments. The wavefront 500 executes on some embodiments of the processing units 105, 110 shown in FIG. 1 and the processing unit 200 shown in FIG. 2. Time increases from left to right in FIG. 5. The line 510 indicates a latency to service a memory access request that hits in a cache, the line 515 indicates a latency to service a memory access request that misses in the cache and is addressed to a location in a local memory, and the line 520 indicates a latency to service a memory access request that misses in the cache and is addressed to a location in a remote memory. Lines 510, 515, and 520 thus are also referred to herein as latencies 510, 515, and 520, respectively.

The wavefront 500 includes eight threads 525 (only one indicated by a reference numeral in the interest of clarity) that concurrently perform the same memory access request. Two of the threads 525 hit in the cache, as indicated by the open boxes 525, and six of the threads 525 miss in the cache, as indicated by the X in the corresponding boxes 525. In the illustrated embodiment, the memory access requests from two of the threads 525 are serviced by the cache and therefore have a latency 510 associated with the cache. The six threads 525 that miss in the cache are serviced by the local memory and therefore have a latency 515 associated with the local memory. As discussed herein, the wavefront 500 stalls until all the memory access requests performed by the threads 525 have been serviced. Thus, the wavefront 500 has a latency 515 that corresponds to the local memory even though some of the threads 525 service their memory access requests with a shorter latency 510 corresponding to the cache.

Figure 6:
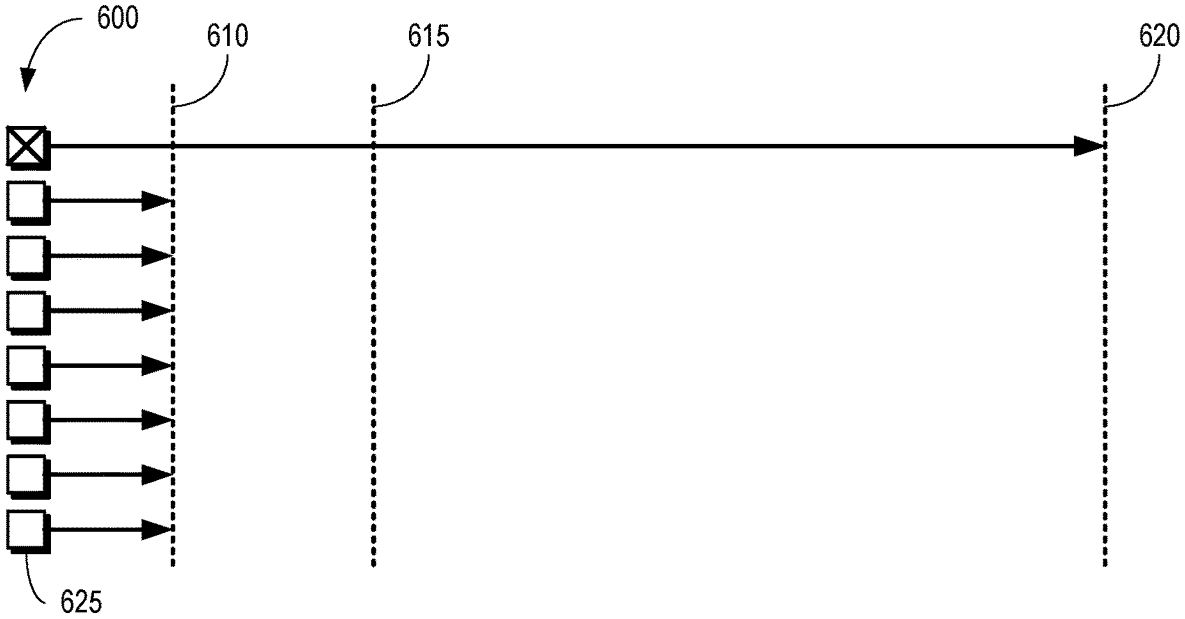
FIG. 6 illustrates a wavefront that includes threads executing a memory instruction that hits in a cache and a single thread executing the memory instruction that misses in the cache according to some embodiments.

FIG. 6 illustrates a wavefront 600 that includes threads executing a memory instruction that hits in a cache and a single thread executing the memory instruction that misses in the cache according to some embodiments. The wavefront 600 executes on some embodiments of the processing units 105, 110 shown in FIG. 1 and the processing unit 200 shown in FIG. 2. Time increases from left to right in FIG. 6. The line 610 indicates a latency to service a memory access request that hits in a cache, the line 615 indicates a latency to service a memory access request that misses in the cache and is addressed to a location in a local memory, and the line 620 indicates a latency to service a memory access request that misses in the cache and is addressed to a location in a remote memory. Lines 610, 615, and 620 thus are also referred to herein as latencies 610, 615, and 620, respectively.

The wavefront 600 includes eight threads 625 (only one indicated by a reference numeral in the interest of clarity) that concurrently perform the same memory access request. Seven of the threads 625 hit in the cache, as indicated by the open boxes 625, and one of the threads 625 misses in the cache, as indicated by the X in the corresponding box 625. In the illustrated embodiment, the memory access requests from seven of the threads 625 are serviced by the cache and therefore have a latency 610 associated with the cache. The single thread 625 that misses in the cache are serviced by the remote memory and therefore has a latency 620 associated with the local memory. Thus, the wavefront 600 stalls for a latency 620 that corresponds to the remote memory even though only one of the threads missed in the cache.

Figure 7:
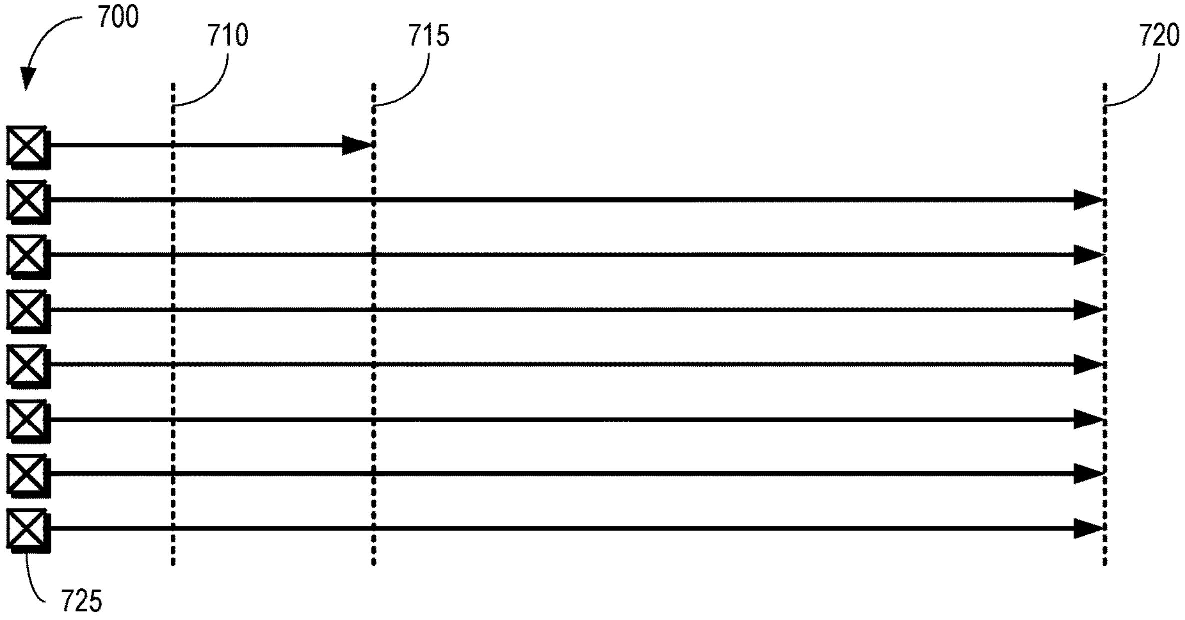
FIG. 7 illustrates a wavefront that includes threads executing a memory instruction that miss in the cache and access memory locations in local and remote memories according to some embodiments.

FIG. 7 illustrates a wavefront 700 that includes threads executing a memory instruction that miss in the cache and access memory locations in local and remote memories according to some embodiments. The wavefront 700 executes on some embodiments of the processing units 105, 110 shown in FIG. 1 and the processing unit 200 shown in FIG. 2. Time increases from left to right in FIG. 7. The line 710 indicates a latency to service a memory access request that hits in a cache, the line 715 indicates a latency to service a memory access request that misses in the cache and is addressed to a location in a local memory, and the line 720 indicates a latency to service a memory access request that misses in the cache and is addressed to a location in a remote memory. Lines 710, 715, and 720 thus are also referred to herein as latencies 710, 715, and 720, respectively.

The wavefront 700 includes eight threads 725 (only one indicated by a reference numeral in the interest of clarity) that concurrently perform the same memory access request. All the threads 725 miss in the cache, as indicated by the X in the corresponding boxes 725. Memory access requests for seven of the threads 725 are serviced by the remote memory and therefore have a latency 720 associated with the remote memory. One of the threads 725 is serviced by the remote memory and therefore has a latency 715 associated with the local memory. Thus, the wavefront 700 stalls for a latency 720 that corresponds to the remote memory even though one of the threads misses was serviced with a much shorter latency 715 associated with the local memory.

Threads that are executing memory access requests, such as the threads shown in FIGS. 3-7, are categorized based on whether the thread hits or misses in a cache, whether the memory access request is addressed to a local memory or a remote memory, and whether other threads in the same wavefront hit or miss in the cache and are addressed to a local or remote memory. Priorities are then assigned to the threads based on the categories and the threads are serviced based on the priorities. In some embodiments, requests that miss in the cache are classified into one of the following categories and this information is encoded in the request that is sent to the memory controller for the corresponding memory.

Thread Categories:

1. Remote miss from a wavefront in which all other threads (or a number of threads that is above a first threshold) are hits. This represents the worst-case memory divergence; this remote miss is very likely to be the bottleneck because the wavefront will not resume execution until this miss has been serviced.
2. Remote miss from a wavefront in which all other threads (or a number of threads that is above a second threshold) are local misses. The local misses incur latency in being serviced, but this remote miss is likely to be the bottleneck.
3. Remote miss from a wavefront in which all other threads (or a number of threads that is above a third threshold) are also remote misses. This case exhibits limited memory divergence but in some cases is important to accelerate depending on the amount of latency tolerance, i.e., how many other wavefronts from this core are ready to execute while this wavefront stalls.
4. Local miss from a wavefront in which all other threads (or a number of threads that is above a fourth threshold) are hits. This represents the worst-case memory divergence for a non-NUMA GPU and can have significant performance effects. This type of miss is very likely to be the bottleneck, although the performance penalty is not as severe as in category 1.
5. Local miss from a wavefront in which all other threads (or a number of threads that is above a fifth threshold) are also local misses. This case exhibits limited memory divergence but the wavefront stalls until all of the local misses (which all fall into this category) are serviced.
6. Local miss from a wavefront in which all other threads (or a number of threads that is above a sixth threshold) are remote misses. The latency of this local miss is unlikely to stall the wavefront.

The categories are listed above in priority order from highest priority at category 1 to lowest priority at category 6. However, other embodiments use more or fewer categories with different relative priorities. For example, the relative ordering of categories 3 and 4 (below) is highly dependent on the relative cost of local vs. remote accesses and the amount of latency tolerance in the system. As the relative cost of a remote access increases, it becomes less important to prioritize category 4 (because the local misses become relatively less expensive). As the amount of latency tolerance increases, it becomes less important to prioritize category 3.

In some embodiments, memory controllers maintain a separate queue for each of the categories and the memory controllers service the queues based on their relative priorities. The thread priorities may be fixed, determined dynamically based on the characteristics of the application, or set explicitly by software. In some embodiments, some of these categories can be merged in order to reduce the hardware overhead of maintaining separate queues. Time-batching can be used to avoid starvation of requests from low-priority queues. Instead of queues for the above priorities, some embodiments of the memory controllers use the priorities as hints and use them in combination with other memory controller policies.

Characteristics of cache hits or misses by threads in a wavefront are used to modify policies that are used to configure or control caches in some cases. Some embodiments of the processing units 105, 110 shown in FIG. 1 and the processing unit 200 shown in FIG. 2 are configured to determine whether a request is to local or remote memory at a relatively early point in the memory pipeline. For example, in some designs, a virtual-to-physical address mapping occurs at the first cache access (e.g., an L0 cache). The location of the backing store (i.e., local memory or remote memory) is determined at this point based on the address mapping. Address interleaving schemes map different addresses to different memories, e.g., consecutive and contiguous 4 KB regions are mapped to local and remote memories, which makes it trivial to determine whether the request is local or remote based on the physical address in the memory access request. Alternatively, one or more bits could be added to each TLB entry to indicate whether the page is local or remote. In contrast, whether a request hits or misses in a higher-level cache such as the L2 cache is not known precisely until after the L2 access occurs. In principle, the location of the page could be predicted with some degree of accuracy earlier, but the information upon which the prediction is made it is likely to be stored at or near the L2, so the prediction is unlikely to occur at the L1 level. Some embodiments of cache controllers leverage this distinction by modifying the L1 controller to change the order in which requests are sent to the L2, e.g., remote requests are sent before local requests to reduce the effective latency of the remote requests.

Cache bypassing is performed at the wavefront level to minimize memory divergence in some cases. Performance is further improved in some embodiments by performing cache bypassing at the thread level, e.g., if the goal is to minimize remote misses at all costs. Performance is improved by turning some misses that result in long-latency remote memory accesses into short-latency cache hits even if that turns some hits into misses that access the local memory because the latency of a local-memory miss is much shorter than the latency of a remote-memory miss. Thus, in some embodiments, all local requests bypass the cache and all remote requests access the cache, which maximizes the amount of cache space available to the more expensive remote requests.

In some embodiments, information about whether accesses are local or remote is used to classify wavefronts as all-hit, mostly-hit, balance, mostly-miss, or all-miss. The baseline wavefront classification is used to guide cache bypassing, cache insertion, and memory scheduling. For example, the greater the fraction of remote accesses in a wavefront, the more important it is to attempt to turn a mostly-hit wavefront into an all-hit wavefront. Thus, the threshold for classifying a wavefront as mostly miss or balanced is dependent on the fraction of remote accesses within the wavefront. Wavefronts with more remote accesses are more likely to be classified as mostly hit than balanced. The threshold between mostly-miss and balanced wavefronts is dependent on the fraction of remote accesses within the wavefront. Wavefronts with more remote accesses are more likely to be classified as balanced than mostly miss, which allows wavefronts with more remote accesses to preferentially take advantage of the cache resources.

In some embodiments, the classification thresholds are selected or configured so that a greater fraction of remote memory accesses are cached in the situation where the utilization of the path to remote memory is high, thus helping to reduce the usage of the path to the remote memory. The classification thresholds can also be configured based on other variables including link bandwidth, fraction of remote accesses, average memory access latencies, performance, and the like, e.g., using a machine-learning approach. In some embodiments, cache insertion policies are modified to take into account local versus remote accesses. For example, a cache block from a local request is biased towards the least recently used (LRU) position when it is inserted into the cache, while a cache block from a remote request is biased towards the most recently used (MRU) position when it is inserted into the cache.

Figure 8:
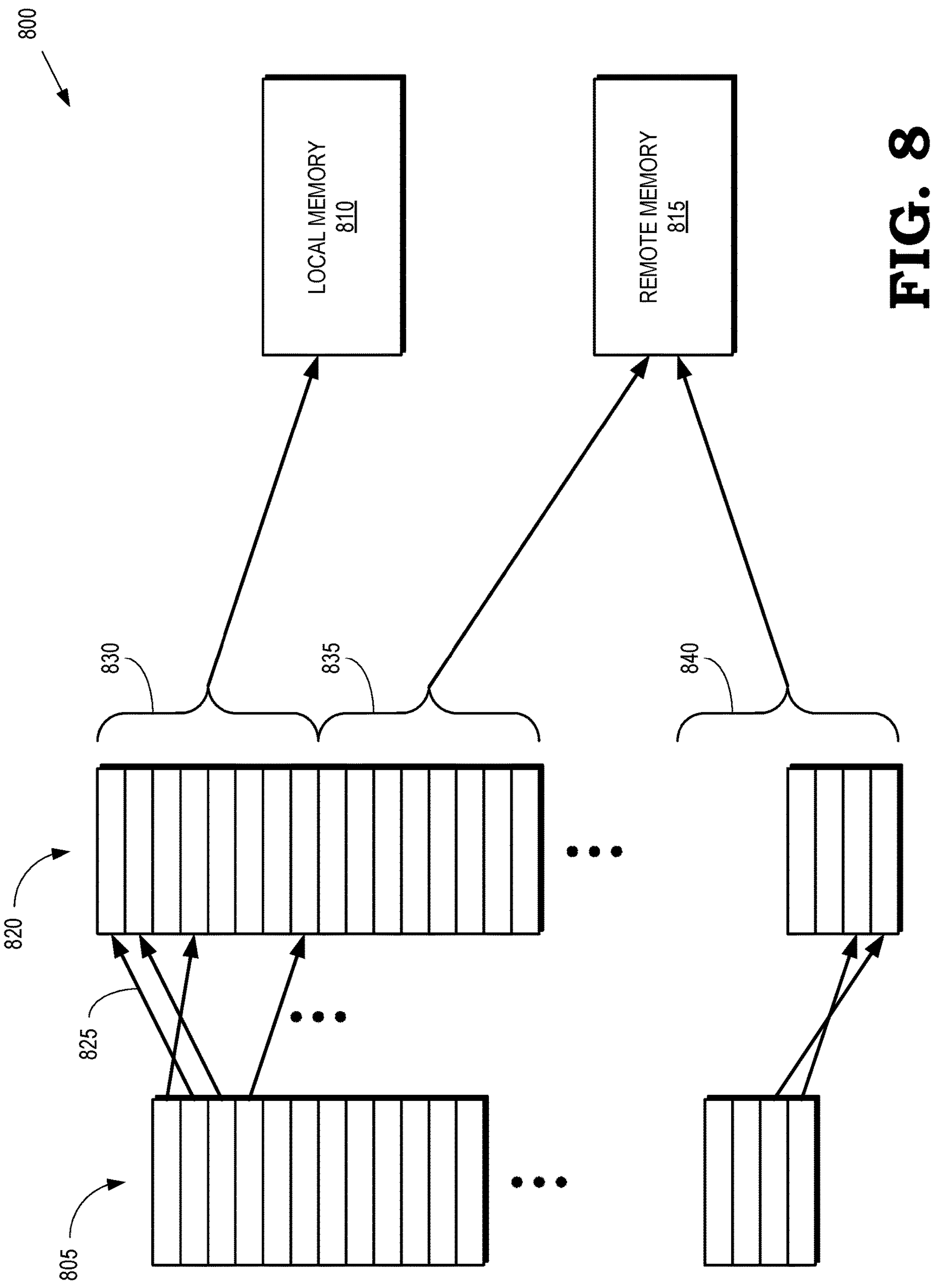
FIG. 8 is a block diagram of a mapping of a set of virtual addresses to a local memory or a remote memory according to some embodiments.

FIG. 8 is a block diagram of a mapping 800 of a set of virtual addresses 805 to a local memory 810 or a remote memory 815 according to some embodiments. The mapping 800 is cached in some embodiments of the TLBs 140, 145 shown in FIG. 1. The local memory 810 and the remote memory 815 represent some embodiments of the memories 115, 120 shown in FIG. 1. The virtual addresses 805 are used by applications that are being executed by processing unit such as the processing units 105, 110 shown in FIG. 1 and the processing unit 200 shown in FIG. 2. The mapping 800 is used to translate the virtual addresses 805 in memory access requests to corresponding physical addresses 820, which indicate addresses of memory locations in the local memory 810 or the remote memory 815. The mappings 800 of individual virtual addresses 805 to the physical addresses 820 are indicated by arrows 825 (only one indicated by a reference numeral in the interest of clarity).

In the illustrated embodiment, the processing unit determines whether a memory access request is addressed to the local memory 810 or the remote memory 815 based on an address interleaving scheme. Alternate contiguous blocks of physical addresses 820 correspond to the local memory 810 and the remote memory 815. For example, the physical addresses 820 in the block 830 indicate locations in the local memory 810, the physical addresses 820 in the next contiguous block 835 indicate locations in the remote memory 815, and the physical addresses 820 in a subsequent contiguous block 840 indicate locations in the remote memory 815. The processing unit is therefore able to determine whether the memory access request is addressed to the local memory 810 or the remote memory 815 in response to a TLB providing a translation of a virtual address 805 to a physical address 820.

Figure 9:
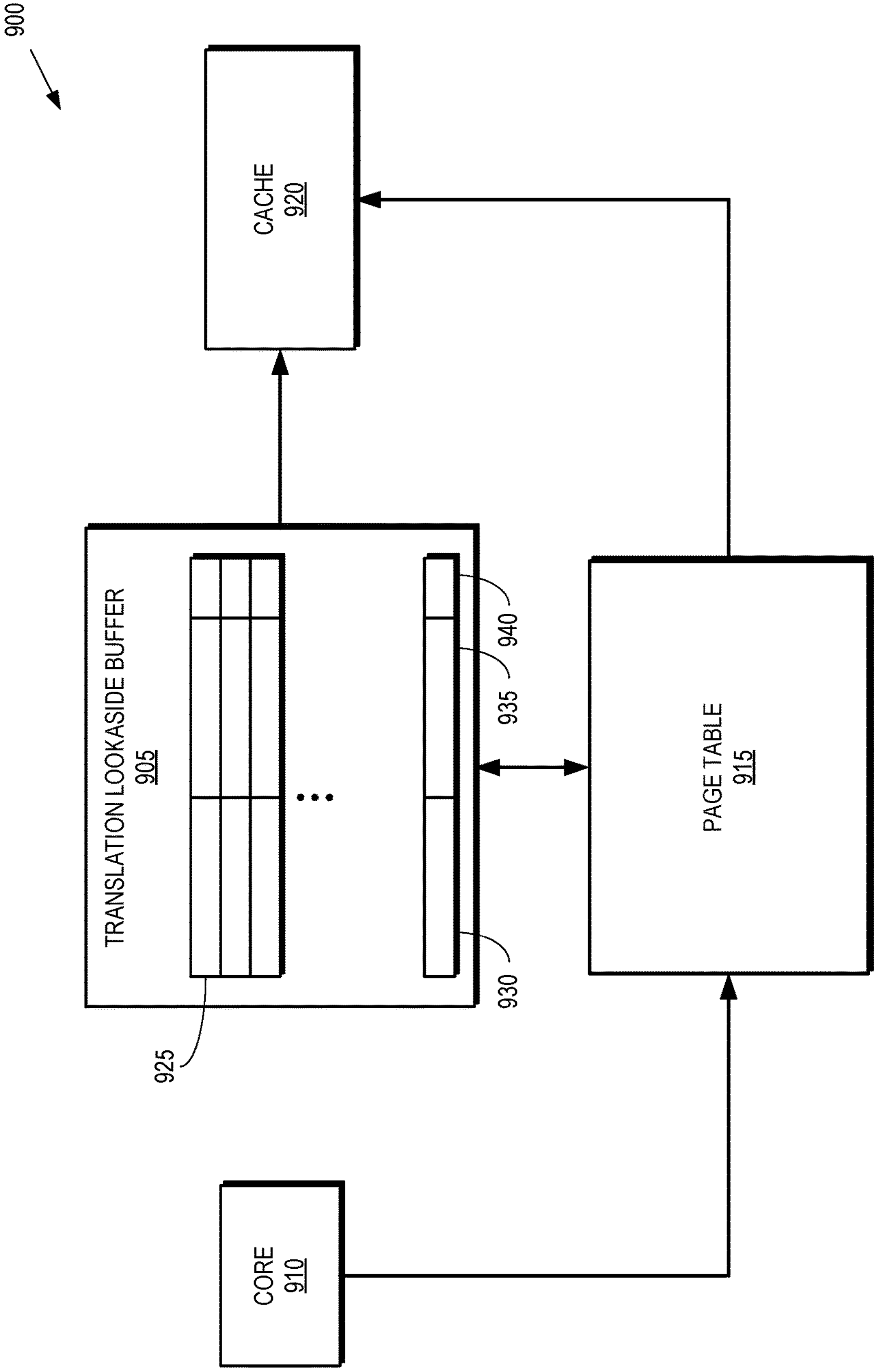
FIG. 9 is a block diagram of the portion of a processing unit that uses information in entries of a translation lookaside buffer (TLB) to determine whether memory access requests are addressed to local or remote memories according to some embodiments.

FIG. 9 is a block diagram of the portion 900 of a processing unit that uses information in entries of a translation lookaside buffer (TLB) 905 to determine whether memory access requests are addressed to local or remote memories according to some embodiments. The portion 900 is implemented in some embodiments of the processing units 105, 110 shown in FIG. 1 and the processing unit 200 shown in FIG. 2. The portion includes a processor core 910 that executes threads to perform memory access requests to virtual addresses. Translations of the virtual addresses to physical addresses in the local or remote memories are stored in one or more page tables 915. Copies of recently used translations are cached in the TLB 905.

In operation, the core 910 first attempts to locate a translation of a virtual address in the TLB 905, which returns the corresponding physical address if the request hits in the TLB 905. If the request misses, a walk of the page table 915 is performed to determine the translation. The core 910 uses the physical address to send a memory access request to a cache 920, which represents a single cache or a cache hierarchy. If the memory access request hits in the cache 920, the core 910 performs the memory access request using information stored in the cache 920. If the memory access request misses in the cache 920, the core performs the memory access request using the local or remote memory indicated by the physical address.

The TLB 905 includes entries 925 (only one indicated by a reference numeral in the interest of clarity). In the illustrated embodiment, each entry 925 corresponds to a row in the TLB 905. The entries 925 include a first field that stores information representing a virtual address and a second field that stores information representing a corresponding physical address. In the illustrated embodiment, the first field corresponds to a column 930 in the TLB 905 and the second field corresponds to a column 935 in the TLB 905. The entries in the TLB 925 also include a third field to store one or more bits that indicate whether the physical address identifies a location in a local memory or a remote memory. For example, the third field can store a bit that is set to a first value (1) to indicate a physical address in a local memory and a second value (0) to indicate a physical address in a remote memory. In the illustrated embodiment, the third field corresponds to a column 940 in the TLB 905. The core 910 is therefore able to categorize and prioritize cache misses for individual threads (as discussed herein) by determining whether the miss was to an address in the local memory or the remote memory based on information in the column 940.

Figure 10:
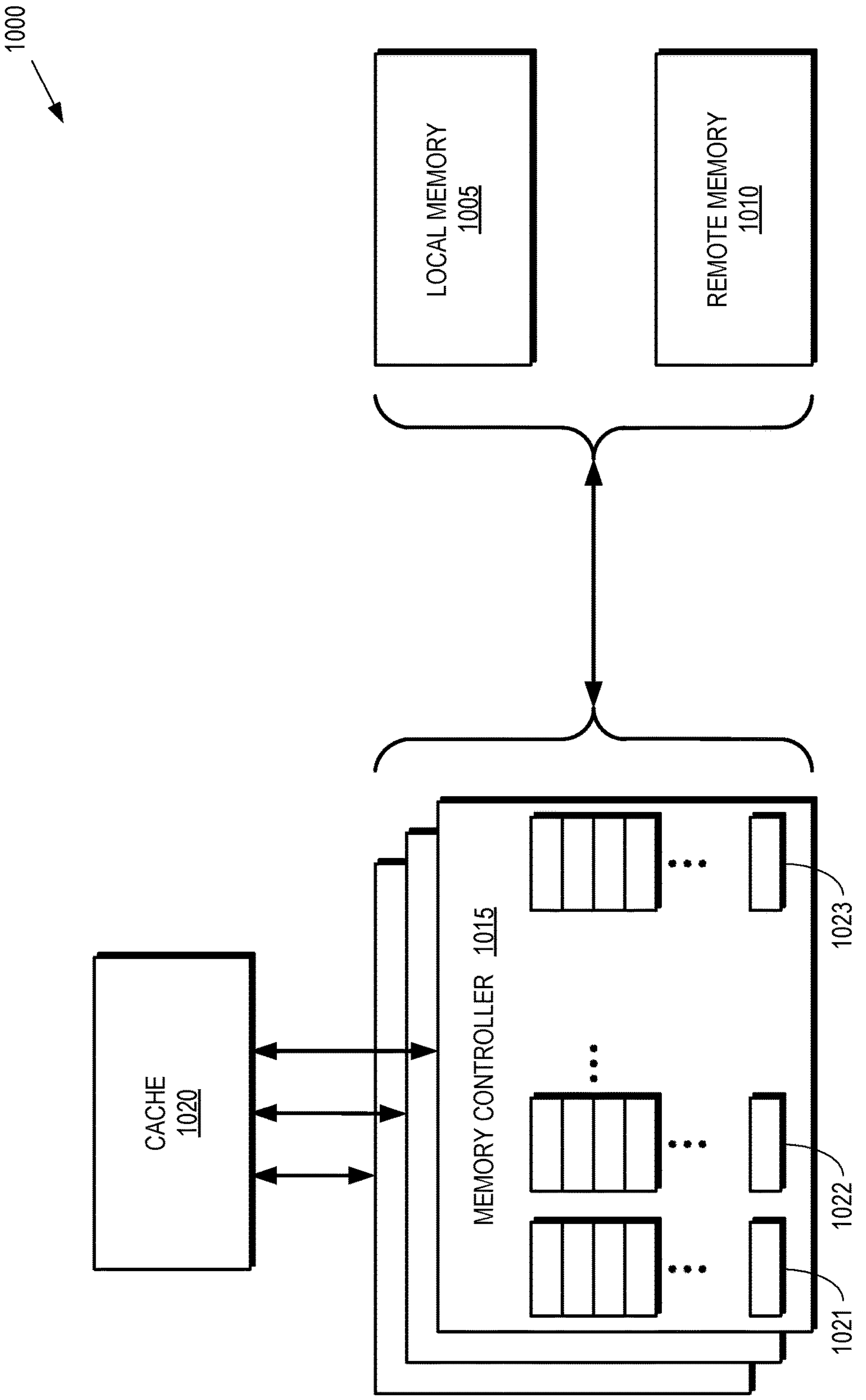
FIG. 10 is a block diagram of a memory subsystem that includes local memory and remote memory according to some embodiments.

FIG. 10 is a block diagram of a memory subsystem 1000 that includes local memory 1005 and remote memory 1010 according to some embodiments. The memory subsystem 1000 is implemented in some embodiments of the processing system 100 shown in FIG. 1. The memory subsystem 1000 includes one or more memory controllers 1015 that are associated with a cache 1020 and the local memory 1005. Each of the memory controllers 1015 is associated with a memory channel. Some embodiments of the local memory 1005 and the remote memory 1010 are accessed via multiple memory channels that are associated with corresponding memory controllers 1015. The memory subsystem 1000 operates in accordance with NUMA principles and is therefore able to provide memory access requests to the remote memory 1010. As discussed herein, threads in a wavefront that is being executed on a processor core (not shown in FIG. 10) associated with the local memory 1005, the memory controller 1015, and the cache 1020 are categorized and prioritized in response to the threads missing in the cache 1020. The memory controller 1015 is configured to service the memory access requests based on the priorities.

In the illustrated embodiment, the memory controller 1015 includes a set of queues 1021, 1022, 1023 (collectively referred to herein as "the queues 1021-1023") that are associated with corresponding priorities. For example, the queue 1021 is associated with a first priority, the queue 1022 is associated with a second priority that is lower than the first priority, and the queue 1023 is associated with a third priority that is lower than the second priority. Each entry in one of the queues 1021-1023 corresponds to a thread that missed in the cache 1020. The memory controller 1015 services the entries in the queues 1021-1023 based on the corresponding priorities associated with the queues 1021-1023. Thus, the memory controller 1015 reduces or eliminates the effects of memory divergence by servicing the threads in the wave fronts on a thread-by-thread basis.

Figure 11:
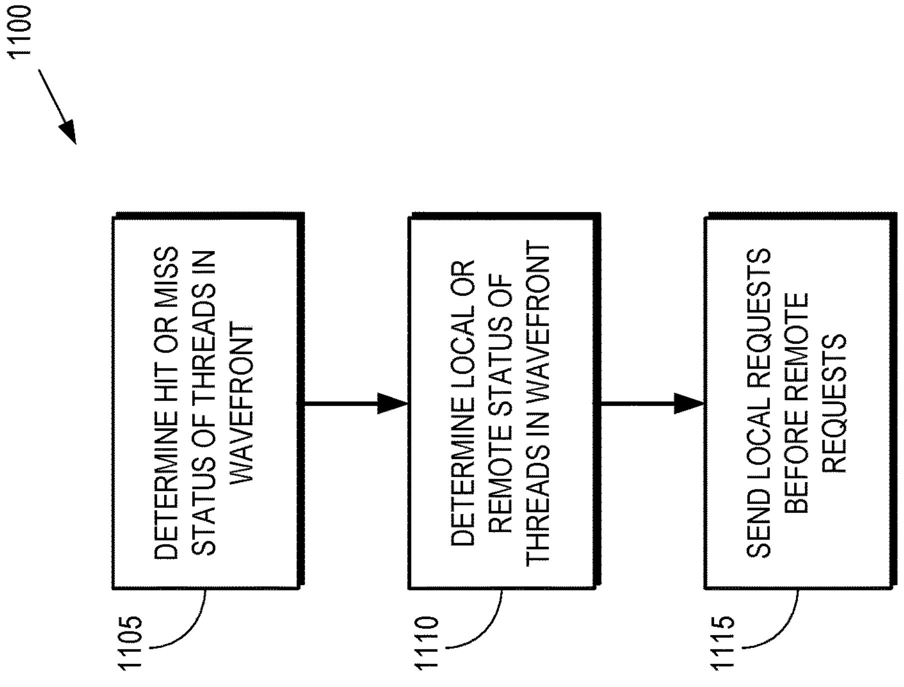
FIG. 11 is a flow diagram of a method for implementing a cache policy that preferentially sends requests to local memory according to some embodiments.

FIG. 11 is a flow diagram of a method 1100 for implementing a cache policy that preferentially sends requests to local memory according to some embodiments. The method 1100 is implemented in some embodiments of the processing units 105, 110 shown in FIG. 1 and the processing unit 200 shown in FIG. 2.

At block 1105, the hit or miss status of threads in a wavefront that attempt to access information in a cache while executing the same memory access request is determined. Threads hit in the cache if the information requested by the memory access is present in an entry of the cache. Otherwise, the threads miss in the cache.

At block 1110, the local or remote status of the threads in the wavefront is determined. Threads are local if the memory access request is for information stored in a local memory and remote if the memory access request is for information stored in a remote memory. As discussed herein, in some embodiments, the local or remote status of the threads is determined based on a virtual-to-physical address mapping. For example, the mapping can be combined with an address interleaving scheme to determine the local or remote status, as illustrated in FIG. 8. For another example, information stored in a TLB is used to determine the local or remote status, as illustrated in FIG. 9.

At block 1115, remote requests are preferentially served before local requests. In some embodiments, and L1 controller is configured to change the order in which requests are sent to an L2 cache so that remote requests are sent before local requests to reduce the effective latency of the remote requests.

Figure 12:
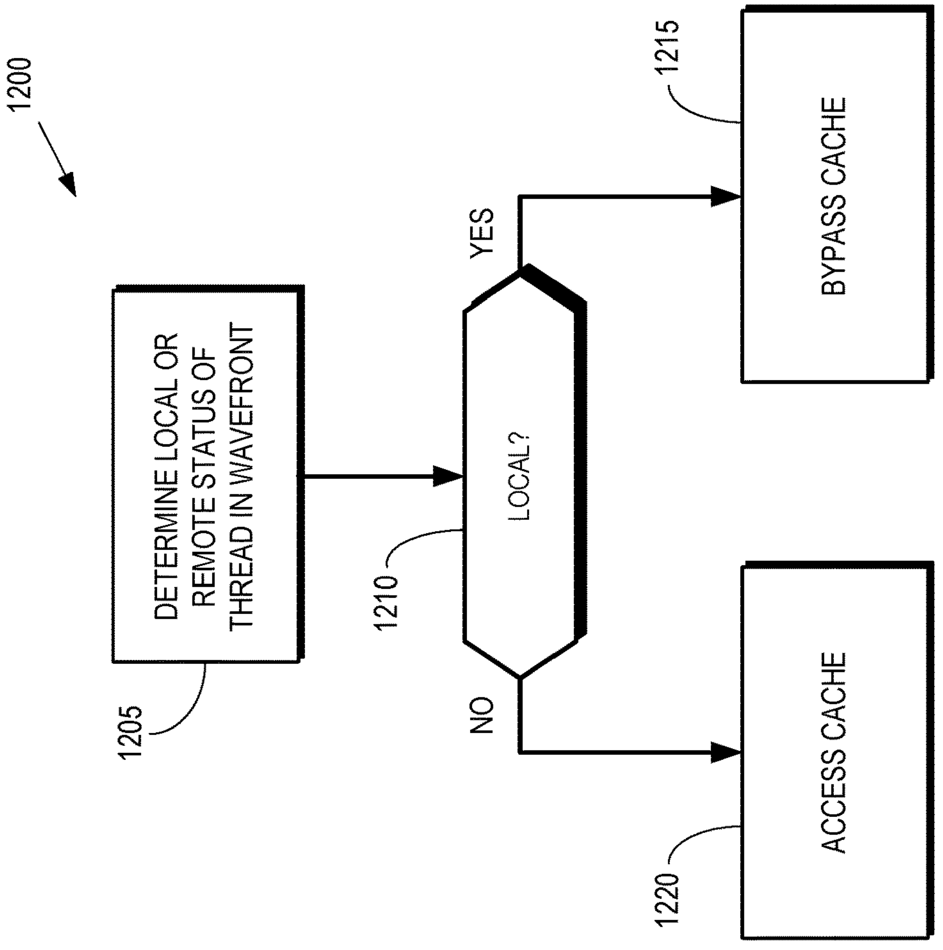
FIG. 12 is a flow diagram of a method for selectively bypassing a cache based on a local or remote status of a thread according to some embodiments.

FIG. 12 is a flow diagram of a method 1200 for selectively bypassing a cache based on a local or remote status of a thread according to some embodiments. The method 1200 is implemented in some embodiments of the processing units 105, 110 shown in FIG. 1 and the processing unit 200 shown in FIG. 2.

At block 1205, the local or remote status of the threads in the wavefront is determined. Threads are local if the memory access request is for information stored in a local memory and remote if the memory access request is for information stored in a remote memory. As discussed herein, in some embodiments, the local or remote status of the threads is determined based on a virtual-to-physical address mapping. For example, the mapping can be combined with an address interleaving scheme to determine the local or remote status, as illustrated in FIG. 8. For another example, information stored in a TLB is used to determine the local or remote status, as illustrated in FIG. 9.

At decision block 1210, the method 1200 flows to block 1215 if the status of the thread is local and flows to block 1220 if the status of the thread is remote. At block 1215, the thread bypasses the cache and the memory access request is sent directly to the local memory. At block 1220, the thread attempts to perform the memory access request using information stored in the cache.

Figure 13:
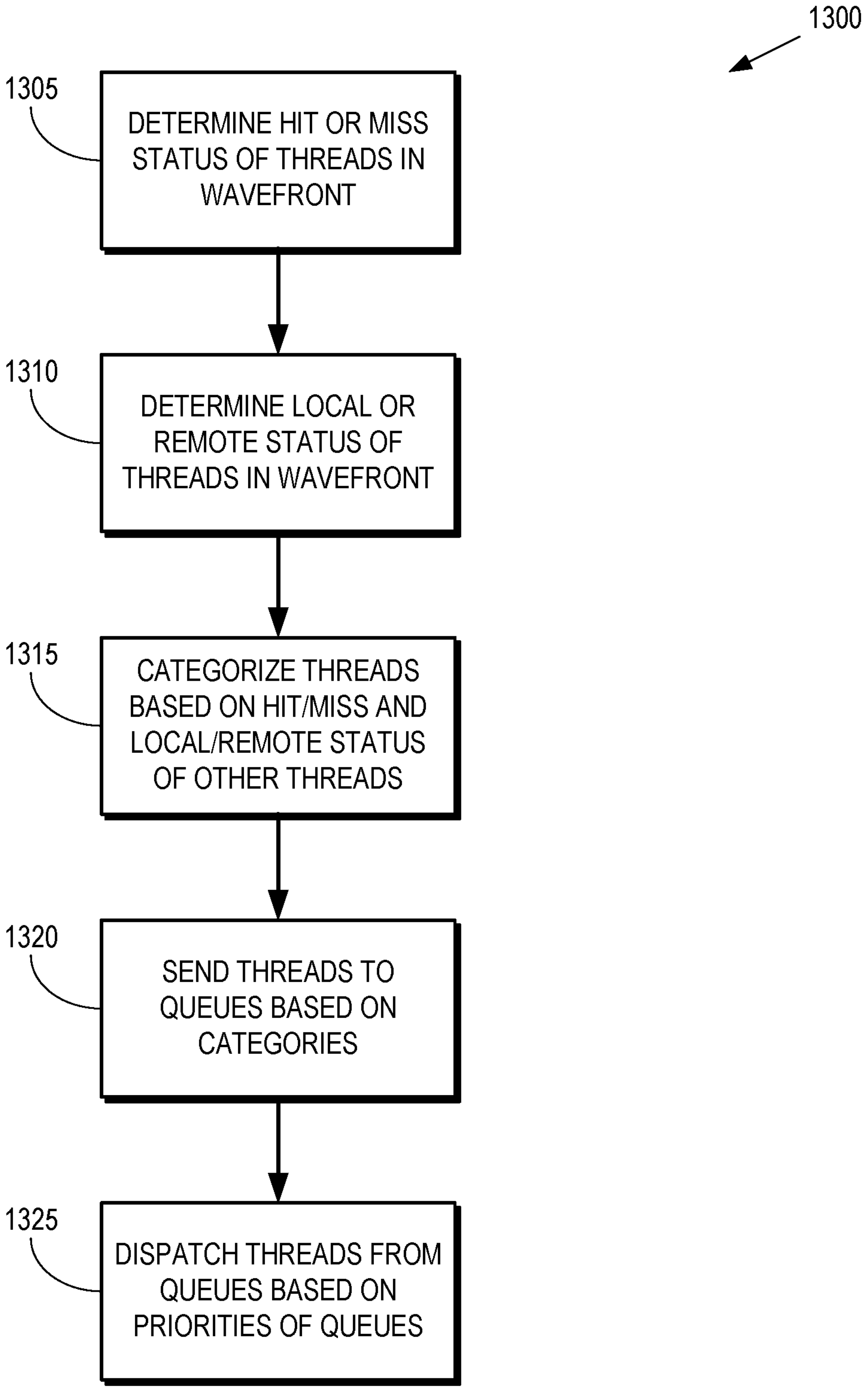
FIG. 13 is a flow diagram of a method for categorizing and prioritizing threads in a wavefront that perform the same memory access request according to some embodiments.

FIG. 13 is a flow diagram of a method 1300 for categorizing and prioritizing threads in a wavefront that perform the same memory access request according to some embodiments. The method 1300 is implemented in some embodiments of the processing units 105, 110 shown in FIG. 1 and the processing unit 200 shown in FIG. 2.

At block 1305, the hit or miss status of threads in a wavefront that attempt to access information in a cache while executing the same memory access request is determined. Threads hit in the cache if the information requested by the memory access is present in an entry of the cache. Otherwise, the threads miss in the cache.

At block 1310, the local or remote status of the threads in the wavefront is determined. Threads are local if the memory access request is for information stored in a local memory and remote if the memory access request is for information stored in a remote memory. As discussed herein, in some embodiments, the local or remote status of the threads is determined based on a virtual-to-physical address mapping. For example, the mapping can be combined with an address interleaving scheme to determine the local or remote status, as illustrated in FIG. 8. For another example, information stored in a TLB is used to determine the local or remote status, as illustrated in FIG. 9.

At block 1315, the threads are categorized based on the hit or miss status and the local or remote status of the thread and the corresponding statuses of other threads in the wavefront. As discussed herein, threads that are executing memory access requests are categorized based on whether the thread hits or misses in a cache, whether the memory access request is addressed to a local memory or a remote memory, and whether other threads in the same wavefront hit or miss in the cache and are addressed to a local or remote memory. Priorities are assigned to the threads based on the categories and the threads are serviced based on the priorities.

At block 1320, the threads are sent to queues in one or more memory controllers associated with the local or remote memories. The queues are associated with the priorities that are assigned to the threads. In some embodiments, the threads are sent to the queues 1021-1023 in the memory controller 1015 shown in FIG. 10.

At block 1325, threads are dispatched from the queues based on the priorities associated with the queues. For example, threads in the queue 1021 are preferentially dispatched ahead of threads in the queue 1023 if the queue 1021 is associated with a higher priority than the queue 1023. In some embodiments, time-batching of the request is used to avoid starvation of the lower priority queues.

In some embodiments, the apparatus and techniques described above are implemented in a system comprising one or more integrated circuit (IC) devices (also referred to as integrated circuit packages or microchips), such as the processing system described above with reference to FIGS. 1-13. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

detecting a miss in a cache by a thread in a wavefront comprising a plurality of threads that are each executing a corresponding memory access request concurrently on a corresponding plurality of processor cores;

assigning a priority to the thread based on whether the memory access request is addressed to a local memory or a remote memory; and performing the memory access request for the thread based on the priority.

2. The method of claim 1, further comprising:

determining whether the memory access request is addressed to the local memory or the remote memory based on an address interleaving scheme for a virtual-to-physical address mapping or information stored in an entry of a translation lookaside buffer.

3. The method of claim 1, wherein assigning the priority to the thread further comprises assigning the priority to the thread based on a first number of the plurality of threads that miss in the cache and a second number of the plurality of threads that hit in the cache.

4. The method of claim 3, wherein assigning the priority to the thread further comprises:

assigning a first priority to the thread in response to the miss being addressed to the remote memory and the second number being above a first threshold;

assigning a second priority, lower than the first priority, to the thread in response to the miss being addressed to the remote memory and the first number being above a second threshold;

assigning a third priority, lower than the second priority, to the thread in response to the miss being addressed to the remote memory and a fraction of other threads in the wavefront that also miss in the cache and are addressed to the remote memory being above a third threshold;

assigning a fourth priority, lower than the third priority, to the thread in response to the miss being addressed to the local memory and the second number being above a fourth threshold;

assigning a fifth priority, lower than the fourth priority, to the thread in response to the miss being addressed to the local memory and a fraction of other threads in the wavefront that also miss in the cache and are addressed to the local memory being above a fifth threshold; and assigning a sixth priority, lower than the fifth priority, to the thread in response to the miss being addressed to the local memory and a fraction of other threads in the wavefront that also miss in the cache and are addressed to the remote memory being above a sixth threshold.

5. The method of claim 1, further comprising:

allocating the thread to one of a plurality of queues maintained in a local memory controller for the local memory and a remote memory controller for the remote memory based on the priority.

6. The method of claim 5, wherein the plurality of queues is associated with a corresponding plurality of priorities, and wherein performing the memory access request comprises servicing the queues based on the plurality of priorities.

7. The method of claim 1, further comprising:

bypassing the cache in response to the memory access request being addressed to the local memory; and accessing the cache in response to the memory access request being addressed to the remote memory.

8. The method of claim 1, further comprising:

requesting a cache block in response to the miss;

biasing the cache block towards a least recently used (LRU) position in the cache in response to requesting the cache block from the local memory and in response to the requested cache block being inserted into the cache; and biasing the cache block towards a most recently used (MitU) position in the cache in response to requesting the cache block from the remote memory and in response to the requested cache block being inserted into the cache.

9. The method of claim 1, further comprising:

sending memory access requests to the cache in an order that is determined based on whether the memory access request is addressed to the local memory or the remote memory.

10. An apparatus comprising:

a plurality of processor cores configured to execute a wavefront including a plurality of threads that perform a memory access request; and a cache to store information for at least one of the plurality of processor cores, wherein a priority is assigned to a thread in response to the memory access request performed by the thread missing in the cache, wherein the priority is determined based on whether the memory access request is addressed to a local memory or a remote memory, and wherein a corresponding one of the plurality of processor cores performs the memory access request for the thread based on the priority.

11. The apparatus of claim 10, further comprising:

a translation lookaside buffer configured to store an entry that indicates a virtual-to-physical address mapping for the memory access request, wherein an address interleaving scheme for the virtual-to-physical address mapping or information stored in the entry of the translation lookaside buffer indicates whether the memory access request is addressed to the local memory or the remote memory.

12. The apparatus of claim 10, wherein the priority is assigned to the thread based on a first number of the plurality of threads that miss in the cache and a second number of the plurality of threads that hit in the cache.

13. The apparatus of claim 12, wherein:

a first priority is assigned to the thread in response to the miss being addressed to the remote memory and the second number being above a first threshold;

a second priority, lower than the first priority, is assigned to the thread in response to the miss being addressed to the remote memory and the first number being above a second threshold;

a third priority, lower than the second priority, is assigned to the thread in response to the miss being addressed to the remote memory and a fraction of other threads in the wavefront that also miss in the cache and are addressed to the remote memory being above a third threshold;

a fourth priority, lower than the third priority, is assigned to the thread in response to the miss being addressed to the local memory and the second number being above a fourth threshold;

a fifth priority, lower than the fourth priority, is assigned to the thread in response to the miss being addressed to the local memory and a fraction of other threads in the wavefront that also miss in the cache and are addressed to the local memory being above a fifth threshold; and a sixth priority, lower than the fifth priority, is assigned to the thread in response to the miss being addressed to the local memory and a fraction of other threads in the wavefront that also miss in the cache and are addressed to the remote memory being above a sixth threshold.

14. The apparatus of claim 10, further comprising:

a local memory controller for the local memory, wherein the local memory controller maintains a plurality of first queues; and a remote memory controller for the remote memory, wherein the remote memory controller maintains a plurality of second queues, and wherein the thread is allocated to one of the plurality of first queues or the plurality of second queues based on the priority.

15. The apparatus of claim 14, wherein the plurality of first queues and the plurality of second queues are associated with a corresponding plurality of priorities, and wherein the plurality of first queues and the plurality of second queues are serviced based on the plurality of priorities.

16. The apparatus of claim 10, wherein:

the cache is bypassed in response to the memory access request being addressed to the local memory; and the cache is accessed in response to the memory access request being addressed to the remote memory.

17. The apparatus of claim 10, wherein:

a cache block is requested in response to the thread missing in the cache;

the cache block is biased towards a least recently used (LRU) position in the cache in response to requesting the cache block from the local memory and in response to the requested cache block being inserted into the cache; and the cache block is biased towards a most recently used (MRU) position in the cache in response to requesting the cache block from the remote memory and in response to the requested cache block being inserted into the cache.

18. The apparatus of claim 10, wherein:

memory access requests are sent to the cache in an order that is determined based on whether the memory access request is addressed to the local memory or the remote memory.

19. An apparatus comprising:

a plurality of processor cores configured to execute a wavefront including a plurality of threads that perform a memory access request;

a first memory and a second memory configured to store information that is accessible to the plurality of processor cores; and first and second caches to store copies of information stored in the first and second memories, wherein a priority is assigned to a thread in response to the memory access request performed by the thread missing in the first cache, wherein the priority is determined based on whether the memory access request is addressed to the first memory or the second memory, and wherein a corresponding one of the plurality of processor cores performs the memory access request for the thread based on the priority.

20. The apparatus of claim 19, further comprising:

a translation lookaside buffer configured to store an entry that indicates a virtual-to-physical address mapping for the memory access request, wherein an address interleaving scheme for the virtual-to-physical address mapping or information stored in the entry of the translation lookaside buffer indicates whether the memory access request is addressed to the first memory or the second memory.

* * * * *

UNITED STATES PATENT AND TRADEMARK OFFICE

CERTIFICATE OF CORRECTION

PATENT NO. : 10,838,864 B2
APPLICATION NO. : 15/992885
DATED : November 17, 2020
INVENTOR(S) : Michael W. Boyer et al.

It is certified that error appears in the above-identified patent and that said Letters Patent is hereby corrected as shown below:

In the Claims

At Column 18 Line 11, please correct "(MitU) position in the cache" to be --(MRU) position in the cache--

Signed and Sealed this
Fifth Day of September, 2023

Katherine Kelly Vidal

Katherine Kelly Vidal
*Director of the United States Patent and Trademark Office*